Jan. 12, 1932.  F. E. GRUNWALDT  1,841,314
FURNACE FAN AND FILTER
Filed April 4, 1928  4 Sheets-Sheet 1
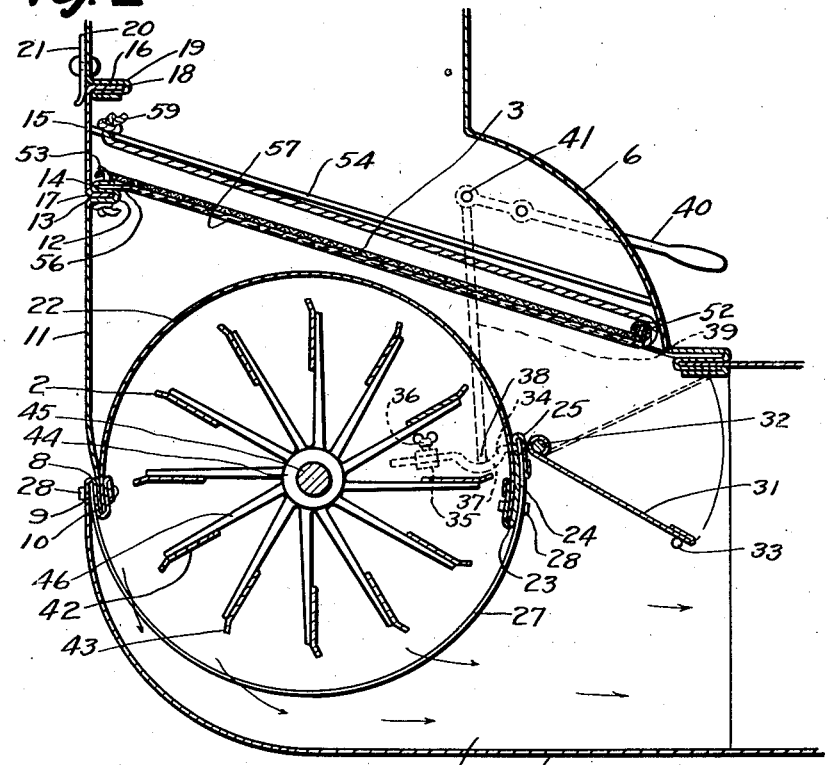
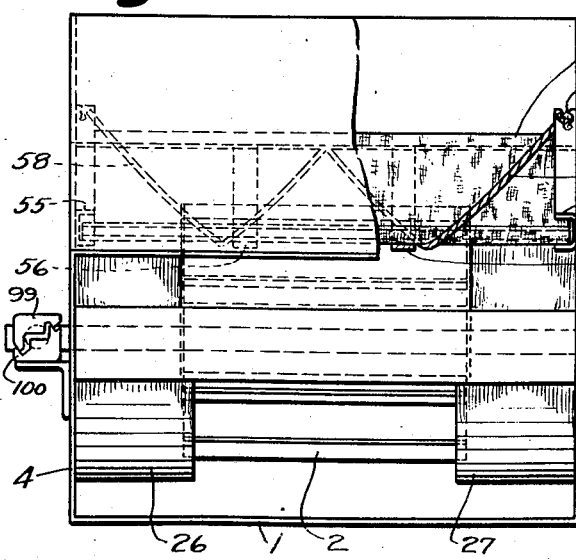
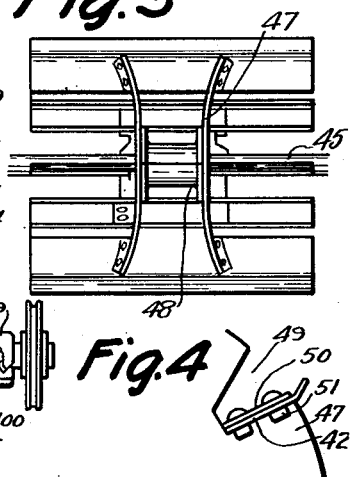
INVENTOR
Frank E. Grunwaldt
Harry Bowen
ATTORNEY

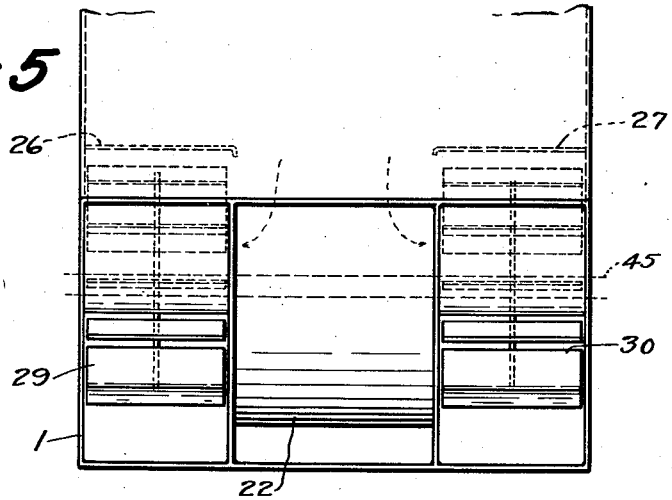
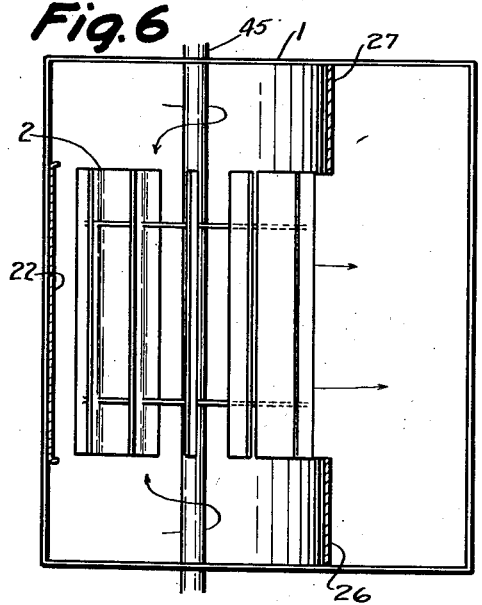
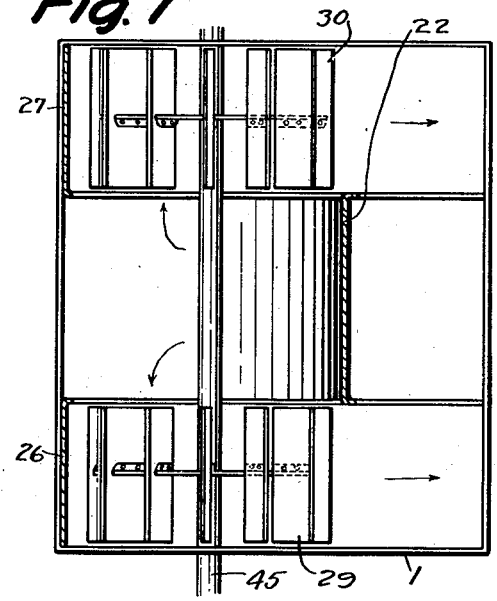
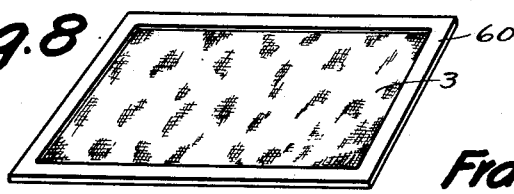

Jan. 12, 1932. F. E. GRUNWALDT 1,841,314
FURNACE FAN AND FILTER
Filed April 4, 1928 4 Sheets-Sheet 3
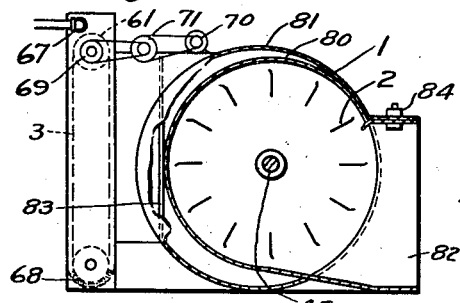
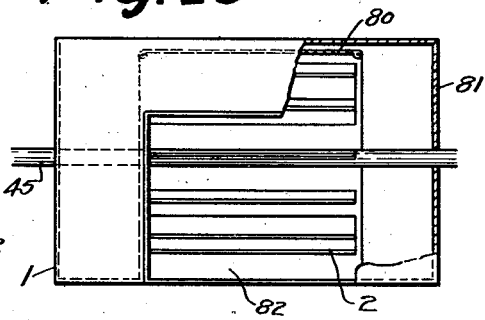
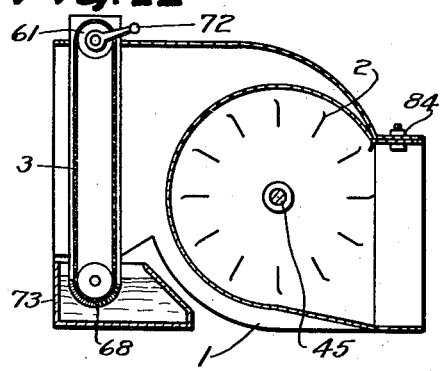
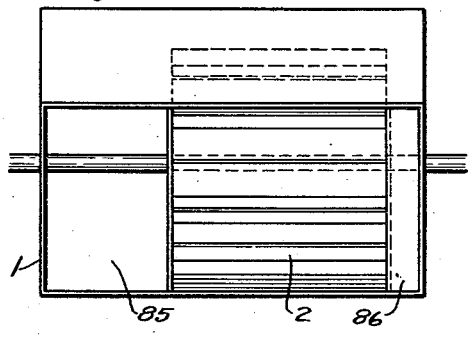
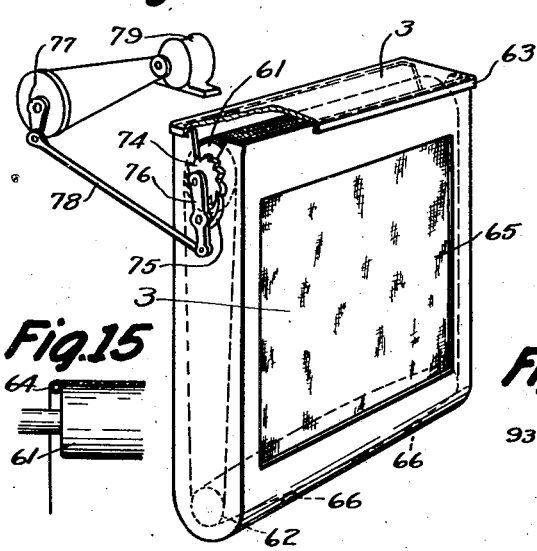
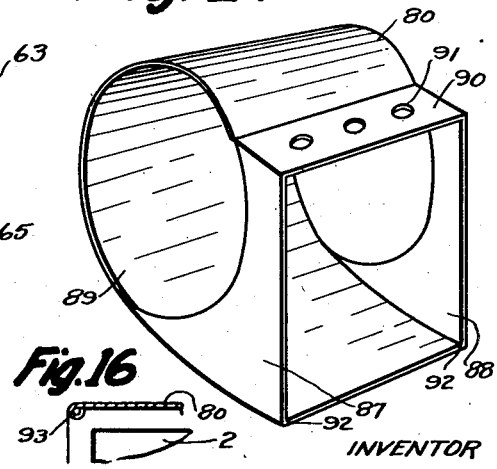
INVENTOR
Frank E. Grunwaldt
ATTORNEY Jan. 12, 1932.　　F. E. GRUNWALDT　　1,841,314

FURNACE FAN AND FILTER

Filed April 4, 1928　　4 Sheets-Sheet 4

INVENTOR
*Frank E. Grunwaldt*

*Harry Bowen*
ATTORNEY

Patented Jan. 12, 1932

1,841,314

UNITED STATES PATENT OFFICE

FRANK E. GRUNWALDT, OF SEATTLE, WASHINGTON

FURNACE FAN AND FILTER

Application filed April 4, 1928. Serial No. 267,465.

The invention is a forced draft fan in combination with a housing and a filter and in which the housing is constructed to provide a by-pass so that the area of the duct in which the fan is located will not be reduced when the fan is stationary.

The object of the invention is to provide a forced draft fan in combination with a housing which may be located in a furnace intake air duct which is also constructed so that the fan will not reduce the area of the duct when not in use.

Another object of the invention is to provide a forced draft fan housing having means for filtering air passing therethrough.

Another object of the invention is to provide a forced draft fan housing in which the parts are readily removable and interchangeable.

Another object of the invention is to provide a filter for a forced draft fan which is simple, economical and efficient.

Another object of the invention is to provide a filter for a forced draft fan which is readily removed and cleaned.

Another object of the invention is to provide a filter for a forced draft fan which may be automatically operated and cleaned.

Another object of the invention is to provide suitable bearings for a forced draft fan which will absorb the vibrations of the fan.

Another object of the invention is to provide bearings which are adaptable to absorb vibrations in which the wear may readily be taken up.

A further object of the invention is to provide a forced draft fan housing having a by-pass around the fan with a baffle to open or close the by-pass which may operate automatically or be operated manually.

A still further object of the invention is to provide a forced draft fan in which air enters at the ends of the blades and which is provided with a disc forming a closure adjacent the center to prevent air travelling through the fan lengthwise of the blades.

And a still further object of the invention is to provide a forced draft fan which is of a simple and economical construction.

With these ends in view the invention embodies a fan housing, a fan positioned within the said housing, an inner removable housing cooperating with the fan, suitable bearings for the fan which are adaptable to absorb the vibrations thereof, an adjustable baffle adaptable to close the passage around the fan and a suitable filter.

Other features and advantages of the invention will appear from the following description taken in connection with the drawings, wherein:—

Figure 1 is a cross section through the fan, housing and filter.

Figure 2 is a front view of the fan shown in Figure 1 with part broken away to show the position of the filter.

Figure 3 is a view showing the fan with discs upon which the blades are mounted which is an alternate arrangement to that shown in Figure 1.

Figure 4 is a detail showing the means of attaching the blades to the discs.

Figure 5 is a view similar to that shown in Figure 2 showing a double fan with the inner housing reversed so that the air will enter the fan blades from the center of the housing and be discharged through two independent openings or ducts.

Figure 6 is a sectional plan showing the positions of the inner housing of the fan shown in Figures 1 and 2.

Figure 7 is a similar view showing the position of the inner housing of the fan shown in Figure 5.

Figure 8 is a view showing an alternate design of the filter shown in Figure 1 in which the filter is made in a frame which is adaptable to slide into the housing.

Figure 9 is a view showing a fan housing of a slightly different design which is provided with a movable filter.

Figure 10 is a front view of the fan shown in Figure 9 with part broken away.

Figure 11 is a view showing a fan of another alternate design and in which the lower end of the filter extends into a water pan.

Figure 12 is a front view of the design shown in Figure 11.

Figure 13 is a view showing a detail of the filter shown in Figures 9 and 11.

Figure 14 is a detail showing the inner removable housing shown in Figures 9 and 11.

Figure 15 is a detail showing a bead formed at the edge of the filter which holds the filter upon the roller.

Figure 16 is a detail showing a bead at the edge of the inner fan housing.

Figure 17:
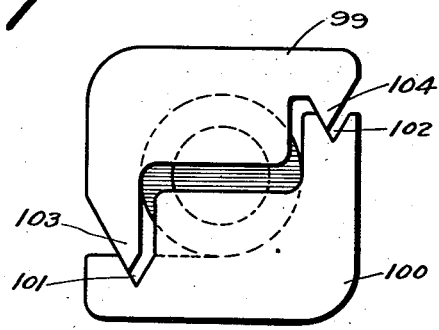
Figure 17 is a detail showing an end view of the vibration absorbing bearing.

In the drawings the device is shown as it would be made wherein numeral 1 indicates the housing, numeral 2 the fan and numeral 3 the filter.

The housing 1 may be made as shown in Figures 1, 5, 9 or 11 as it will be understood that the purpose of the housing is to provide a by-pass in the intake duct of a furnace, around the fan and which is also adaptable to accommodate an inner housing around the fan which is arranged to permit the fan to function.

In the design shown in Figures 1 and 2 the housing 1 is made with side plates 4 and 5, a cover 6 and a bottom 7. The bottom curves upward at the rear as shown in Figure 1 and extends to a point 8 where it is bent as shown to provide a recess 9 on the under side and a recess 10 on the upper side. A back plate 11 may be positioned at the rear of the housing with its lower edge in the recess 10 and its upper edge provided with a flange 12 having a recess 13 at the front and a recess 14 at the inner side as shown. Above the flange 12 is a channel shaped member 15 having flanges 16 and 17 at the ends. The flange 17 is adaptable to be held in the recess 13 and the flange 16 is adaptable to be held in a recess 18 in a flange 19 at the lower edge of the upper back plate 20. The plate 20 may also be provided with a clip 21 which will hold the member 15 in place.

The fan 2 is positioned in the housing as shown in Figures 1 and 2 and an upper semi-circular plate 22 is placed over the fan with one edge of the plate 22 held in the recess 10 and the other edge held in a recess 23 in a cross member 24 on the opposite side of the fan. The member 24 is also provided with an oppositely positioned recess 25 in which the ends of semi-circular members 26 and 27 may be held and the opposite ends of the members 26 and 27 will be held in the recess 9 at the upper edge of the bottom plate 7. The ends of these members may be held in the recesses by bolts 28 as shown or in any other suitable manner. It will be observed that as the bolts are removed these members may readily be removed and interchanged. The members 22, 26 and 27 form an inner housing around the fan blades and in the design shown in Figure 1 the upper portion 22 of this housing extends over the blades and the lower portions 26 and 27 are positioned beyond the ends of the blades so that air passing downward through the duct will pass into the ends of the blades and then be forced out through the center of the housing, as indicated by the arrows; whereas these members may be interchanged as shown in Figure 5 with the fan divided into two parts as indicated by the numerals 29 and 30, and in this arrangement the member 22 will be placed on the lower side of the fan and the members 26 and 27 on the upper sides of the fans so that the air will be drawn into the fan blades from the center and discharged through two independent openings at the sides.

At the front of the fan housing is a baffle plate 31 which is pivotally mounted on a shaft 32 and adaptable to rest upon stops 33 at the sides. At the end of the shaft 32 is an arm 34 having a weight 35 upon it which may readily be adjusted by a set screw 36 to balance the baffle 31 so that as a back pressure is built up on the air leaving the fan or if the volume of the suction should increase the baffle 31 will automatically raise and force all of the air through the fan. The arm 34 is also provided with a recess 37 in which the end 38 of a rod 39 extends and the other end of the arm 39 is pivotally attached to a lever 40 which is pivotally mounted on the side of the fan housing at the point 41 and it will be observed that as the lever 40 is raised it will raise the baffle 31 whereas, as the end 38 is not attached to the arm 34 the baffle 31 may automatically rise independent of the manual means for operating it. It is understood that this baffle may be used in any of the designs hereinafter described.

The fan 2 is made with blades 42 which are formed of flat plates with their outer edges curved slightly forward to form tips 43 and these blades may be attached to hubs 44 on a shaft 45 through arms 46 as shown in Figure 1 or attached to discs 47 which are mounted upon the shaft 45 through hubs 48 as shown in Figure 3, or in any other suitable manner. In the design shown in Figure 3 the discs 47 are provided with openings 49, the material from which extends outward to form flanges 50 to which the blades 42 may be attached by rivets or bolts 51 as shown in Figure 4. It is understood that although the fan is shown and described as being made in this manner it may be made in any other suitable manner or any other suitable type of fan may be used.

In the design shown in Figure 1 the filter 3 is formed with a flat piece of textile material with a rod 52 at one end and the opposite end fastened over hooks 53 as shown. The edges of the filter are held in channel shaped members 54 and 55 as shown in Figures 1 and 2 and the housing is also provided with stays 56 which will support the central part of the filter. Cords 57 and 58 may also be attached to the back of the frame and extend forward around the lower end of the filter and then backward over the filter where the ends which are indicated by the numeral 59 may be held as shown in Figures 1 and 2 so that when it is desired to remove the filter the ends 59 of the cords may be pulled out and the cords will cause the filter to roll up on the rod 51. The rod 51 may be of sufficient weight to unroll the filter by rolling downward in the channel shaped members 54 and 55 when the filter is replaced. It is understood however that the filter may be provided with a solid frame 60 as shown in Figure 8 or may be made as shown in Figure 13 or in any other suitable manner.

In the design shown in Figure 13 the filter is made with a continuous piece of fabric and mounted upon an upper roller 61 and a lower roller 62 with the upper roller mounted in the upper end of a frame 63 and the lower roller adaptable to rotate freely in the lower end of the frame. The lower roller 62 is slightly enlarged at the center as shown in Figure 13 which will take up the stretch in the central part of the filter and the edges of the filter fabric are made as shown in Figure 15 with a roll 64 which extends over the edges of the rollers and which will have a tendency to hold the filter upon the roller or prevent its working off of either end. The frame 63 may be made in any suitable manner and provided with opening 65 in both sides so that air may pass through the openings in both sections of the filter. The lower end of the frame may be provided with openings 66 which provide a drain when the filter is used wet as shown in Figures 9 and 11. In the design shown in Figure 9 the filter is arranged in a vertical position at the rear of the fan housing and the upper part of the frame is provided with a perforated pipe 67 which may spray water upon the filter on the roller 61 to keep the filter moist and in the lower end of the frame is a brush or pad as indicated by the numeral 68 which will clean the filter. In the design shown in Figure 9 the water may be permitted to flow away from the lower end of the filter. In this design the roller 61 is provided with a pulley 69 which is continuously driven by a motor 70 through reduction gears as indicated by the numeral 71. It is understood that the gears and motor may be arranged in any suitable manner and any suitable means may be used for connecting them to the roller 61.

In the design shown in Figure 11 the roller 61 is provided with a crank 72 so that it may be operated by hand and a pan 73 is provided in the lower end of the filter which may contain a supply of water so that the lower end of the filter will pass through water as its position is changed. In the design shown in Figure 13 the end of the roller 61 is provided with a ratchet gear 74 which is operated by a pawl 75 on an arm 76 and the arm 76 is moved backward and forward by an eccentric 77 through a rod 78. The eccentric 77 may be driven by a motor 79 or in any other suitable manner.

In the design shown in Figures 9 and 10 the fan is positioned in an inner housing 80 as shown in Figure 14 which is installed in an outer housing 81 and the outer housing is made somewhat longer than the fan as shown in Figure 10 so that air may enter the fan blades at the ends and be forced forward as the blades rotate through an opening 82 at the center of the housing. The housing 81 is so arranged that the inner housing 80 may be withdrawn through the rear when the filter is removed. In this design the rear of the inner housing 80 may be provided with struts 83 which will hold the housing in relation to the fan and outer housing so that it will remain in a stationary position. In this design and also in the design shown in Figure 11 the inner housing may be fastened to the outer housing by bolts 84 at the front as shown.

In the design shown in Figures 11 and 12 the housing is similar to that shown in Figures 9 and 10 except that the inner housing is positioned toward one side of the outer housing so that a by-pass will be provided at one side which is shown by an opening 85 in Figure 12. In this design the inner housing 80 is provided with a flange 86 at one side which holds the housing a short distance from the end of the outer housing so that air may enter through the ends of the blades. It is also understood that the housings may be arranged and positioned in any other suitable manner.

The inner housing 80 is shown in detail in Figure 14 in which it will be observed that it is provided with side walls 87 and 88 having circular openings 89 and at the upper end is a flat cross member 90 having openings 91 through which the bolts 84 pass and from the rear of the member 90 is a curved plate conforming to the periphery of the openings 89 and extending downward to the point 92 which form the lower ends of the sides 87 and 88. The edges of the openings 89 are provided with rolls 93 as shown in Figure 16.

Figure 18:
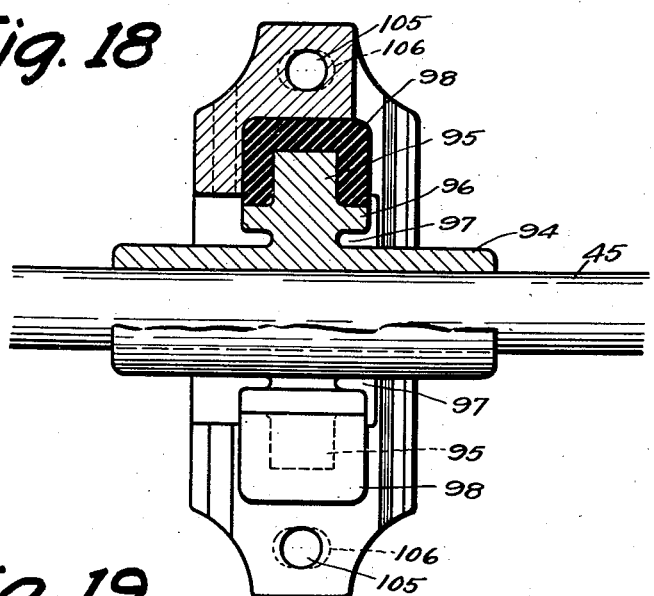
Figure 18 is a sectional plan through the bearing.
Figure 19:
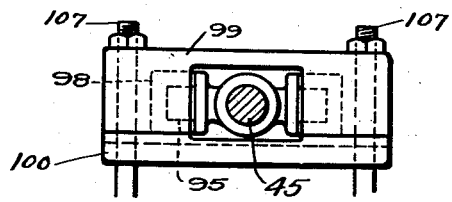
Figure 19 is a side elevation of the bearing.

Figures 17, 18 and 19 show details of the vibration absorbing bearing which is made with a cylindrical member 94 through which the shaft 45 passes. The member 94 is provided with trunnions 95 at the sides having flanges 96 with recesses 97 between the flanges and the member 94 which prevent oil passing from the bearing casing 94 beyond the flanges 96. The outer ends of the trunnions 95 are provided with caps 98 that may be made of rubber or any other suitable resilient material and these caps are rigidly held in recesses in the members 99 and 100 as shown. The member 100 is provided with slots 101 and 102 having inclined edges and the member 99 is provided with tongues 103 and 104 also having inclined surfaces corresponding with the slots 101 and 102 and positioned as shown in Figure 17 so that as the members 99 and 100 are drawn together the inclined surfaces will move each toward the center so that the recesses will grip the members 98, and it will be observed that as the members 98 wear the members 99 and 100 may be drawn closer together to hold them rigid. At the ends of the members 99 and 100 are openings 105 and 106. The openings 105 in the members 99 are substantially round whereas the openings 106 in the members 100 are slotted to provide further lateral movement of the members as they are drawn together. Bolts 107 may be placed through these openings which will hold the bearing and through which the wear of the caps 98 may also be taken up. It is also understood that the specific details of this bearing are immaterial as other means may be used for drawing the two members together, or for drawing each toward the center as they are drawn together.

It will be understood that changes may be made in the construction without departing from the spirit of the invention. One of which changes may be in the relative positions of the fan, inner housing and filter in relation to each other or to the outer casing. Another may be in the use of a fan of a different type, another may be in the use of a different type of filter, and still another may be in the change of the designs of either the outer or inner housings.

The construction will be readily understood from the foregoing description. In use the fan may be positioned as shown and it will be observed that as it rotates air will be drawn in through the ends of the blades and forced out through the centers of the blades and as it is drawn in through the filter it will be thoroughly cleaned. The filter may be readily removed and cleaned or may be used dry as may be desired. The entire filter frame as shown in Figure 13 is readily removable from the housing shown in Figures 9 and 11 and it will be observed that as this frame is raised in the design shown in Figure 11 the water pan 73 may readily be removed. The filter may also be readily removed from the frame as the upper roller is positioned in slots as shown and the lower roller hangs free in the frame. The lower roller should be of substantially a heavy material to hold the filter smooth. Either roller however may be made of any suitable material. It will also be observed that the wet screen or filter may be used in the path of the out-going gases from the furnace to catch sparks if desired.

Having thus fully described the invention, what I claim as new and desire to secure by Letters Patent, is:

1. In a device of the class described, a fan, a circular housing around the said fan having an opening in the lower part of the front thereof, said circular housing extending beyond the ends of the fan with the lower part of the front closed and the upper part beyond the ends of the blades open, and an outer housing in which the said former housing is removably mounted.

2. In a device of the class described, a fan, a circular housing around the said fan having an opening in the lower part of the front thereof, said circular housing extending beyond the ends of the fan with the lower part of the front closed and the upper part beyond the ends of the blades open, and an outer housing in which the said former housing is removably mounted, said outer housing having a suitable passage to permit air to pass therethrough around the fan.

3. In a device of the class described, a fan rotor, an outer casing surrounding the said fan rotor and in which the rotor is rotatably mounted, an inner removable casing surrounding and cooperating with the said fan, said outer casing being of sufficient size to permit a bypass air passage around the said fan rotor and inner casing, a baffle plate for closing the said bypass passage between the said inner and outer casings, means for pivotally supporting the said baffle plate from one side to permit it to hang downward in the path of air from the fan rotor, means for counterweighting the said baffle, and manual means for also operating the said baffle, said counterweight being sufficient to permit the said baffle to automatically adjust itself to close the said bypass when the fan is started.

4. In a fan of the character described, a fan, a circular housing around the said fan having openings in the ends thereof, an outer housing around the said circular housing and extending beyond the ends thereof, the ends of the said outer housing being closed and arranged to permit circulation from the said outer housing into the ends of the said circular housing, said outer housing having an inlet opening in the periphery thereof and said circular housing having an outlet opening in the periphery thereof, and means for readily removing the said circular housing.

5. In a device of the class described, a fan, a circular housing around the said fan having an opening in the lower part of the front thereof, said circular housing extending beyond the ends of the fan with the lower part of the front closed and the upper part beyond the ends of the blades open, an outer housing in which the said former housing is removably mounted, said outer housing having a suitable passage to permit air to pass therethrough around the fan, and means in the passage for closing the same when the velocity of air passing through the fan reaches a predetermined amount.

6. In a device of the class described, a fan, a circular housing around the said fan having an opening in the lower part of the front thereof, said circular housing extending beyond the ends of the fan with the lower part of the front closed and the upper part beyond the ends of the blades open, an outer housing in which the said former housing is removably mounted, said outer housing having a suitable passage to permit air to pass therethrough around the fan, a balanced baffle pivotally mounted in the said housing and adapted to close the said passage, and means for operating the said baffle to close the said passage when the velocity of air passing through the fan reaches a predetermined amount.

FRANK E. GRUNWALDT.